(12) United States Patent
Shea

(10) Patent No.: US 7,672,226 B2
(45) Date of Patent: Mar. 2, 2010

(54) METHOD, APPARATUS AND PROGRAM STORAGE DEVICE FOR VERIFYING EXISTENCE OF A REDUNDANT FIBRE CHANNEL PATH

(75) Inventor: Michael John Shea, Rochester, MN (US)

(73) Assignee: Xiotech Corporation, Eden Prairie, MN (US)

( * ) Notice: Subject to any disclaimer, the term of this patent is extended or adjusted under 35 U.S.C. 154(b) by 1435 days.

(21) Appl. No.: 10/658,679

(22) Filed: Sep. 9, 2003

(65) Prior Publication Data

US 2004/0081087 A1 Apr. 29, 2004

Related U.S. Application Data

(60) Provisional application No. 60/409,656, filed on Sep. 9, 2002.

(51) Int. Cl.
    H04L 12/26 (2006.01)
(52) U.S. Cl. ......................... 370/217; 370/248
(58) Field of Classification Search .......... 370/217, 370/248
    See application file for complete search history.

(56) References Cited

U.S. PATENT DOCUMENTS

| | | | |
|---|---|---|---|
| 5,768,623 A | 6/1998 | Judd et al. | |
| 6,157,963 A | 12/2000 | Courtright et al. | |
| 6,219,753 B1 | 4/2001 | Richardson | |
| 6,571,355 B1 | 5/2003 | Linnell | |
| 6,601,187 B1 * | 7/2003 | Sicola et al. | 714/6 |
| 6,671,776 B1 | 12/2003 | DeKoning | |
| 6,732,117 B1 | 5/2004 | Chilton | |
| 6,775,230 B1 | 8/2004 | Watanabe | |
| 6,892,203 B2 | 5/2005 | Kasako et al. | |
| 6,944,133 B2 | 9/2005 | Wisner et al. | |
| 6,952,734 B1 * | 10/2005 | Gunlock et al. | 709/227 |
| 7,010,528 B2 | 3/2006 | Curran et al. | |
| 7,216,148 B2 | 5/2007 | Matsunami et al. | |
| 7,269,646 B2 | 9/2007 | Yamamoto et al. | |
| 2003/0126315 A1 * | 7/2003 | Tan et al. | 710/1 |
| 2004/0148380 A1 | 7/2004 | Meyer et al. | |
| 2004/0153863 A1 * | 8/2004 | Klotz et al. | 714/45 |
| 2006/0072459 A1 * | 4/2006 | Knight et al. | 370/235 |
| 2006/0146698 A1 * | 7/2006 | Ukrainetz et al. | 370/221 |
| 2006/0174000 A1 * | 8/2006 | Graves | 709/225 |
| 2006/0242363 A1 * | 10/2006 | Tamura et al. | 711/117 |
| 2007/0005820 A1 * | 1/2007 | Banzhaf et al. | 710/8 |

OTHER PUBLICATIONS

Steve Sicola, 'SCSI-3 Fault Tolerant Controller Configurations utilizing SCC & New Event Codes', High Availability Study Group, Document No. X3T10 95-312r3, Rev 3.0, Feb. 1996, pp. 1-14.*

(Continued)

*Primary Examiner*—Melvin Marcelo
(74) *Attorney, Agent, or Firm*—Beck & Tysver P.L.L.C.

(57) ABSTRACT

A method, apparatus and program storage device for verifying existence of a redundant Fiber Channel path is disclosed. The present invention verifies that a redundant path exists prior to moving the WWNN and WWPN. Thus, if the path being used for Fiber Channel communication is lost, connectivity can be restored when the source of the original connection can access the physical interface where the WWNN and WWPN have been moved.

50 Claims, 6 Drawing Sheets

OTHER PUBLICATIONS

"Disk Thrashing" Jul 3, 2003. Retrieved from http://www.webopedia.com/TERM/d/disk_thrashig.htm.
Steve Sicola, 'SCSI-3 Fault Tolerant Controller Configurations utilizing SCC & New Event Codes', High Availability Study Group, Document No. X3T10 95-312r3, Rev 3.0, Feb. 1996, pp. 1-14.

Office Action, mailed Jan. 21, 2005, U.S. Appl. No. 10/183,967.
Office Action, mailed Jun. 26, 2008, U.S. Appl. No. 10/819,695.
Office Action, mailed Feb. 3, 2009, U.S. Appl. No. 10/819,695.
Office Action, mailed Jun. 1, 2009, U.S. Appl. No. 10/819,695.
Office Action, mailed Jul. 24, 2009, U.S. Appl. No. 10/819,695.

* cited by examiner

METHOD, APPARATUS AND PROGRAM STORAGE DEVICE FOR VERIFYING EXISTENCE OF A REDUNDANT FIBRE CHANNEL PATH

RELATED PATENT DOCUMENTS

This is a continuation of U.S. Patent Application Ser. No. 60/409,656, filed on Sep. 9, 2002 (XIO 6044.01), and entitled "Method to Detect Existence of Alternate Path for Fibre Channel Communication in a Switch Fabric Environment," to which priority is claimed under 35 U.S.C. §120 for common subject matter and which is fully incorporated herein by reference.

BACKGROUND OF THE INVENTION

1. Field of the Invention

This invention relates in general to Fibre Channel networks, and more particularly to a method, apparatus and program storage device for verifying existence of a redundant Fibre Channel path.

2. Description of Related Art

As computers and peripheral devices continue to improve in performance and capability, the limitations imposed by traditional parallel interfaces are becoming more apparent. Higher performance processors demand higher throughput of systems. Hardware is advancing to address this demand, but the interfaces used currently cannot ultimately keep up. To solve the problem, serial interfaces such as Fibre Channel are beginning to be designed into hardware. With higher data transfer rates, Fibre Channel offers ample performance for current as well as future demands.

Fibre Channel is a high performance, serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high-level protocols.

Fibre channel employs a topology known as a "fabric" to establish connections between ports. A fabric is a network of switches for interconnecting a plurality of devices without restriction as to the manner in which the switch can be arranged. A fabric can include a mixture of point-to-point and arbitrated loop topologies.

In Fibre Channel, a channel is established between two nodes where the channel's primary task is to transport data from one point to another at high speed with low latency. The Fibre channel switch provides flexible circuit/packet switched topology by establishing multiple simultaneous point-to-point connections. Because these connections are managed by the switches or "fabric elements" rather than the connected end devices or "nodes," fabric traffic management is greatly simplified from the perspective of the device.

In a high availability, Fibre Channel switching environment, a second set of "redundant" elements are provided in the event of a failure condition. The number and make-up of the redundant elements parallel the primary elements, and operate as back-up resources if the primary elements fail. As such, in the event of such a fail condition, a switchover to the redundant elements can greatly minimize the loss of transmitted data frames.

Most modern computer networks, including switched and arbitrated-loop fibre-channel networks, are packet oriented. In these networks, data transmitted between machines is divided into chunks of size no greater than a predetermined maximum. Each chunk is typically packaged with a header and a trailer into a packet for transmission. In Fibre-Channel networks, packets are known as Frames.

A Fibre-Channel network having at least one switch is a switched Fibre-Channel fabric. A Fibre-Channel switch is a routing device generally capable of receiving frames, storing them, decoding destination information from headers, and forwarding them to their destination or another switch further along a path toward their destination. A network interface for connection of a machine to a Fibre Channel fabric is known as an N_port, and a machine attached to a Fibre-Channel network is known as a node. Nodes may be computers, or may be storage devices such as RAID systems. An NL_port is an N_port that supports additional arbitration required so that it may be connected either to a Fibre Channel Fabric or to a Fibre Channel Arbitrated Loop, and an L_port is a network interface for connecting a node to a Fibre Channel Arbitrated Loop.

A device including an N_port, L_port, or an NL_port together with hardware for high-speed connection to a machine is a Fibre Channel host bus adapter (physical HBA). For example, a physical HBA may comprise a printed circuit card having one or more NL_ports communicating through a PCI bus interface to an edge connector for connection to a PCI bus of a machine. A physical HBA may, but need not, also incorporate a processor for controlling its ports and its connection to the machine.

A Fibre Channel Switched Fabric may connect one or more Fibre Channel Arbitrated Loops. In a switched Fibre Channel fabric, there may be more than one possible path, or sequence of links, loops, switches, routers, etc. that may be traversed by a frame, between two nodes. Multiple paths may be intentional, providing extra capacity or redundancy to protect against switch, node, or line failures, or may be unintentional consequences of network topology.

Multiple paths between two nodes may also be provided through multiple Fibre Channel arbitrated loops. For example, an initiator node may have two NL_ports, one connected to each of two Fibre Channel arbitrated loops. If each of these loops connects to an NL_port of a target node, then multiple paths from the initiator to the target node exist. This could provide redundancy should a failure occur on one of the arbitrated loops.

As nodes, switches, and links are added to or removed from the network, any local topology database must be updated to reflect valid devices on the network, and valid paths through the network to those devices. Nodes also may determine one or more paths of the valid paths to a given device to be an "active" path. An active path is a path that may be used for exchanges.

The Fibre Channel specifications define Class 1 and Class 4 services to be virtual-circuit, or connection, based services between pairs of nodes. Packets of a given sequence in these services must arrive in-order with respect to other packets of the same sequence. The specifications presume that frames transiting between nodes of each pair follow a virtual circuit between the nodes—all following the same path through the network from node to node and arriving in-order.

Links, loops, and switches of a network may fail. Fibre channel networks may provide more than one path between a pair of nodes. Multiple, redundant, paths provide redundancy to allow continued communications between a pair of nodes should one or sometimes more, but not all, links, loops, or switches, and therefore paths through the network, fail.

Fibre Channel (FC) devices are identified by Nodes and their Ports. Fibre Channel requires each Port to have an unchangeable World Wide Port Name (WWPN). Fibre Channel specifies a Network Address Authority (NAA) to distinguish between the various name registration authorities that may be used to identify the WWPN. Fibre Channel identifies each Node with an unchangeable World Wide Node Name (WWNN). However, in a single port Node, the WWNN and the WWPN may be identical.

One method of providing redundant Fibre Channel connectivity is to provide a mechanism to move World Wide Node Names (WWNN) and World Wide Port Names (WWPN) from one physical interface to another in the event that the original location fails to function or can no longer be reached. However, if the path being used for Fibre Channel communication is lost, connectivity can only be restored if the source of the original connection can access the physical interface where the WWNN and WWPN are moved.

It can be seen then that there is a need for a method, apparatus and program storage device for verifying existence of a redundant Fibre Channel path.

SUMMARY OF THE INVENTION

To overcome the limitations in the prior art described above, and to overcome other limitations that will become apparent upon reading and understanding the present specification, the present invention discloses a method, apparatus and program storage device for verifying existence of a redundant Fibre Channel path.

The present invention solves the above-described problems by verifying that a redundant path exists prior to moving the WWNN and WWPN. Thus, if the path being used for Fibre Channel communication is lost, connectivity can be restored when the source of the original connection can access the physical interface where the WWNN and WWPN have been moved.

A method in accordance with the principles of the present invention includes detecting a connection change in a Fibre Channel network and verifying a backup device has a path to a connection associated with the connection change.

In another embodiment of the present invention, a device for providing a redundant Fibre Channel path is provided. The device includes a port coupled to a Fibre Channel network and a processor, coupled to the port, the processor configured for detecting a connection change in a Fibre Channel network and verifying the port has a path to a connection associated with the connection change.

In another embodiment of the present invention, a network providing a redundant Fibre Channel path is provided. The network includes a local node, a remote node, and a Fibre Channel network coupling the local node and the remote node, wherein at least one of the local node, remote node and Fibre Channel network includes a first physical interface and a backup physical interface, wherein the backup physical interface further includes a port coupled to a Fibre Channel network and a processor, coupled to the port, the processor configured for detecting a connection change in a Fibre Channel network and verifying the backup physical interface has a path to a connection associated with the connection change.

In another embodiment of the present invention, a program storage device readable by a computer is provided. The program storage device tangibly embodies one or more programs of instructions executable by the computer to perform a method for providing a redundant Fibre Channel path, the method includes detecting a connection change in a Fibre Channel network and verifying a backup device has a path to a connection associated with the connection change.

In another embodiment of the present invention, another device for providing a redundant Fibre Channel path is provided. This device includes means for providing a port to a Fibre Channel network and means for processing coupled to the means for providing a port, the means for processing detecting a connection change in a Fibre Channel network and verifying the means for providing a port has a path to a connection associated with the connection change.

In another embodiment of the present invention, another network providing a redundant Fibre Channel path is provided. This network includes a local node, a remote node and a Fibre Channel network coupling the local node and the remote node, wherein at least one of the local node, remote node and Fibre Channel network includes a first means for providing a physical interface and a second means for providing a backup physical interface, wherein the second means further includes means for providing a port to a Fibre Channel network and means for processing coupled to the means for providing a port, the means for processing detecting a connection change in a Fibre Channel network and verifying the backup physical interface has a path to a connection associated with the connection change.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method, apparatus and program storage device for verifying existence of a redundant Fibre Channel path. The present invention verifies that a redundant path exists prior to an event where the WWNN and WWPN are moved. Thus, if the path being used for Fibre Channel communication is lost, connectivity can be restored when the source of the original connection can access the physical interface where the WWNN and WWPN have been moved.

Figure 1:
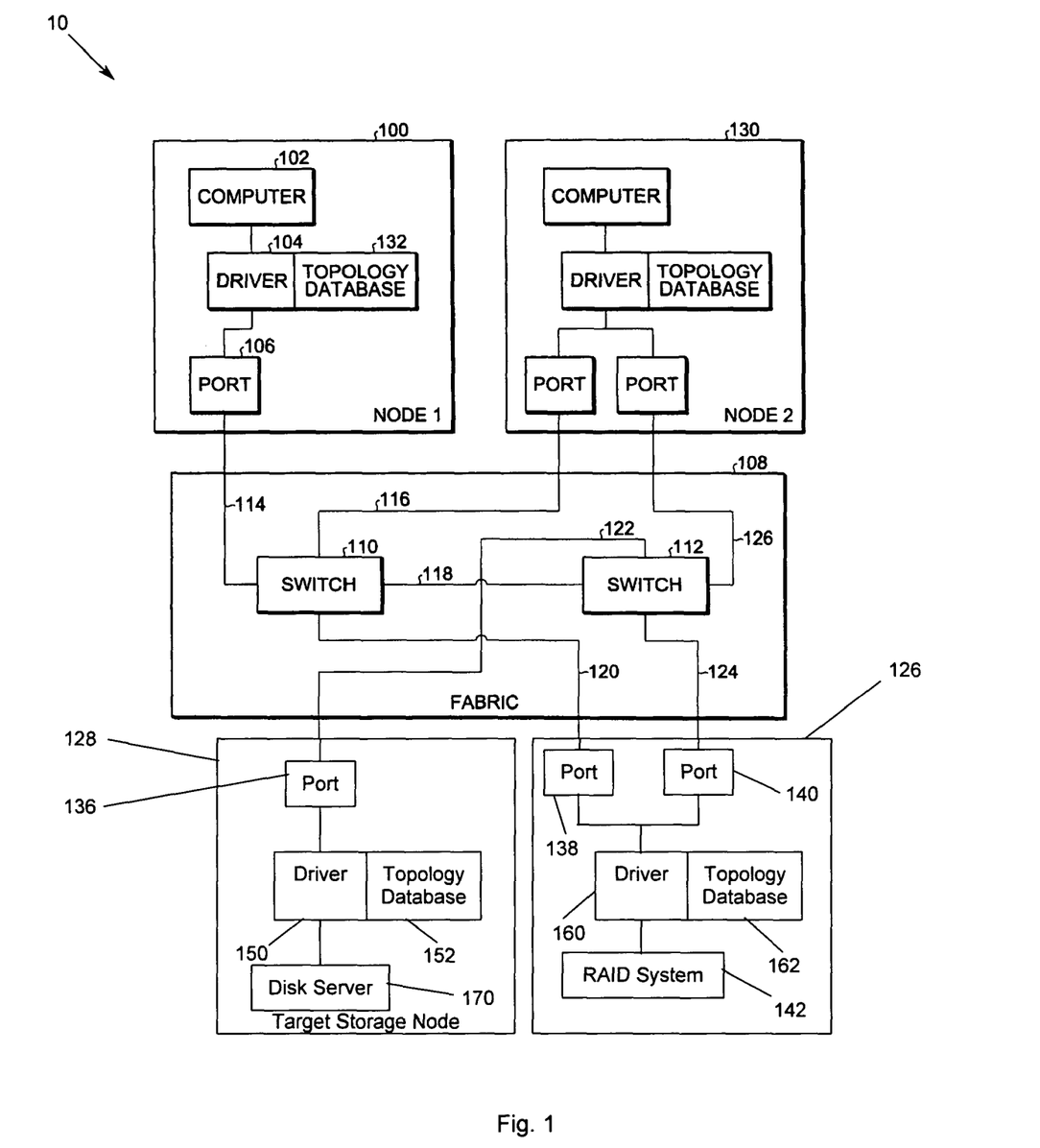
FIG. 1 illustrates a Fibre-Channel network according to an embodiment of the present invention.

FIG. 1 illustrates a Fibre-Channel network 10 according to an embodiment of the present invention. In FIG. 1, the Fibre Channel network 10 includes a first node 100 that comprises a computer 102, software or firmware driver 104 operating in either the computer or in a dedicated processor of a fiber channel interface card, and a Fibre Channel port 106. The network also has a Fibre Channel fabric 108 comprising one or more switches 110 and 112, a plurality of links 114, 116, 118, 120, 122, and 124, and at least one storage node 126 and 128. The network may also have one or more additional computer nodes, such as node 130.

The driver 104 maintains a network topology database 132. This database 132 contains information regarding the topology of the network as is useful for routing packets and determining destinations for valid packets. Target storage node 126 includes port 136 and disk server 170. Target storage node 126 may also include driver 150 and topology database 152. Target storage node 128 includes ports 138, 140 and RAID system 142. Target storage node 128 may also include driver 160 and topology database 162. Moreover, a node, e.g. node 100, may query a name-table stored in the Fabric to verify that it has a redundant path to the other end of the connection. For example, port 140 would be a redundant path to node 126 that is being accessed through port 138, in case the WWNN and WWPN, e.g., associated with port 138, are moved to this physical interface, e.g. port 140. Typically, driver 104 and topology database 132 reside in memory of the computer system of a node. For example, portions of the driver 104 and topology database 132 may reside in memory. The driver 104 may execute in a processor of the node. Portions of the driver 104 and topology database 132 may also reside in memory, for execution by a processor.

Whenever a process executing on the processor of the node generates an I/O request, the request is processed by the operating system to determine which driver should handle the transaction. The request may also be translated into block I/O requests for accessing specific blocks of storage, including blocks of directories as well as blocks of data files. Those block I/O requests accessing fibre-channel-accessible devices are passed to the driver 104, which breaks these transactions into packets for the indicated transaction. Packets are processed by the driver 104 to include a valid header, and dispatched to one of one or more ports for dispatch into the network fabric or arbitrated loop. Those skilled in the art will recognize that the present invention is not meant to be limited to a particular Fibre Channel topology, but rather only a Fibre Channel switched fabric is described for clarity and simplicity of explanation.

Figure 2:
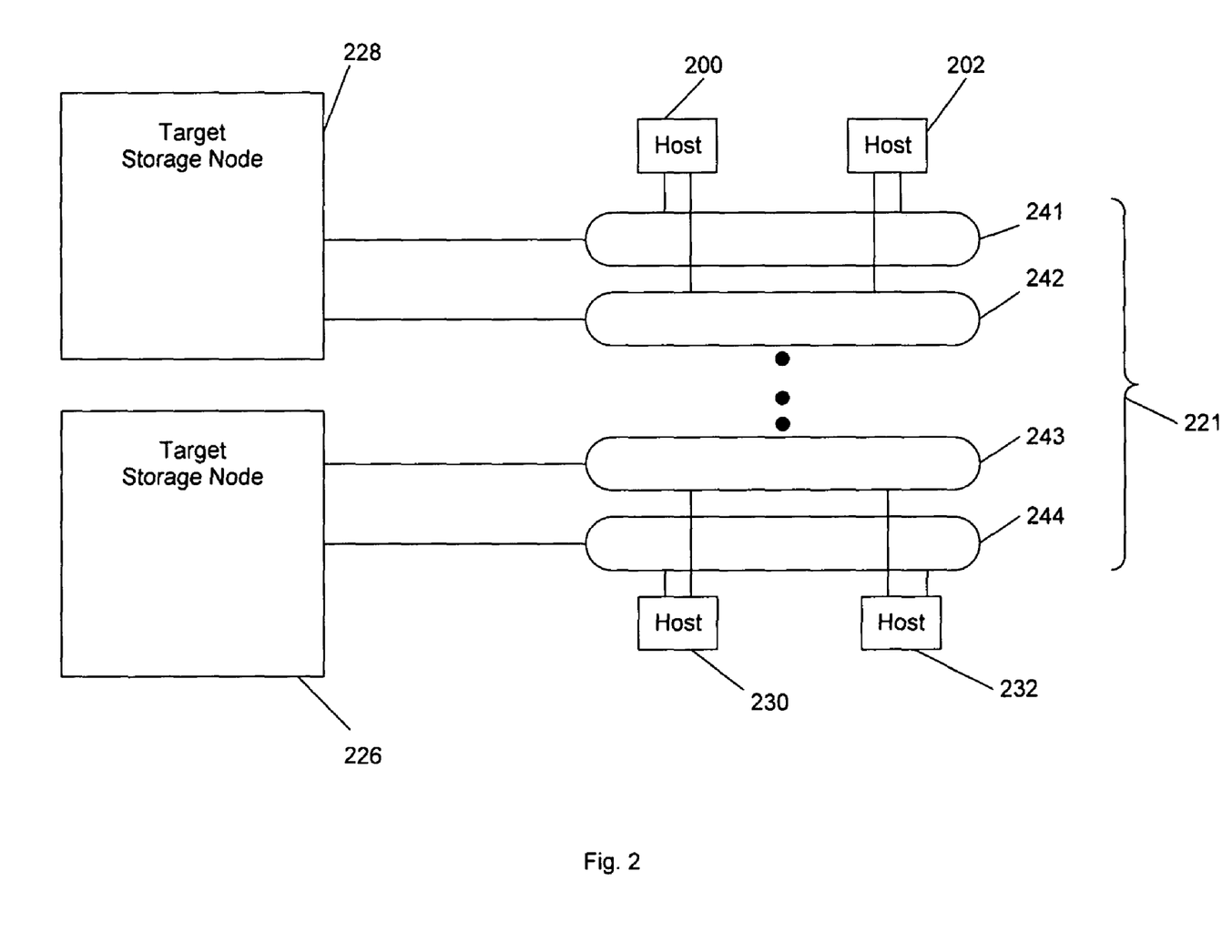
FIG. 2 illustrates an alternative way of connecting a large number of nodes to the target storage nodes according to an embodiment of the present invention.

FIG. 2 illustrates an alternative way of connecting a large number of nodes 200, 202, 230, 232 to the target storage nodes 226, 228 according to an embodiment of the present invention. In this example, the data network 221 includes respective loops 241, 242, 243, 244 connected to each of the target storage nodes 226, 228. Each of the nodes 200, 202, 230, 232 has at least two ports, each of which is connected to a respective loop connected to the port of a different one of the target storage nodes 226, 228. Therefore, if there is a single failure of any one of the loops or a single failure of any one of the target storage nodes 226, 228, there will still be an operational path from each of the nodes 200, 202, 230, 232 to the target storage nodes 226, 228. The loops 241, 242, 243, 244, for example may operate in accordance with the Fibre Channel standards.

Still further, it is possible to replace each of the loops 241, 242, 243, 244 in FIG. 2 with a switch, or to use switches together with loops for connecting hosts to the storage subsystem. In general, for a given number of ports, a loop will be less expensive than a switch, but a switch may provide more bandwidth than a loop. The additional bandwidth of a switch may be needed for ensuring concurrent host access to the storage subsystem or for supporting bandwidth-intensive applications such as interactive video applications.

In general, the nodes 100, 102, 130, 132 may be coupled to the target storage nodes 126, 128 according to various topologies. For example, the nodes 100, 102, 130, 132 may be coupled to the target storage nodes 126, 128 by dedicated port-to-port connections (i.e., so-called point-to-point connections), loops, or switches, or combinations of these connections. In addition to switches, the nodes 100, 102, 130, 132 may be coupled to the target storage nodes 126, 128 via other connectivity devices such as hubs, bridges and routers. Because the data network 221 could have various topologies, it is desirable to provide a facility for enabling any device in the network to determine the configuration of at least that portion of the network that is accessible to the device.

Figure 3:
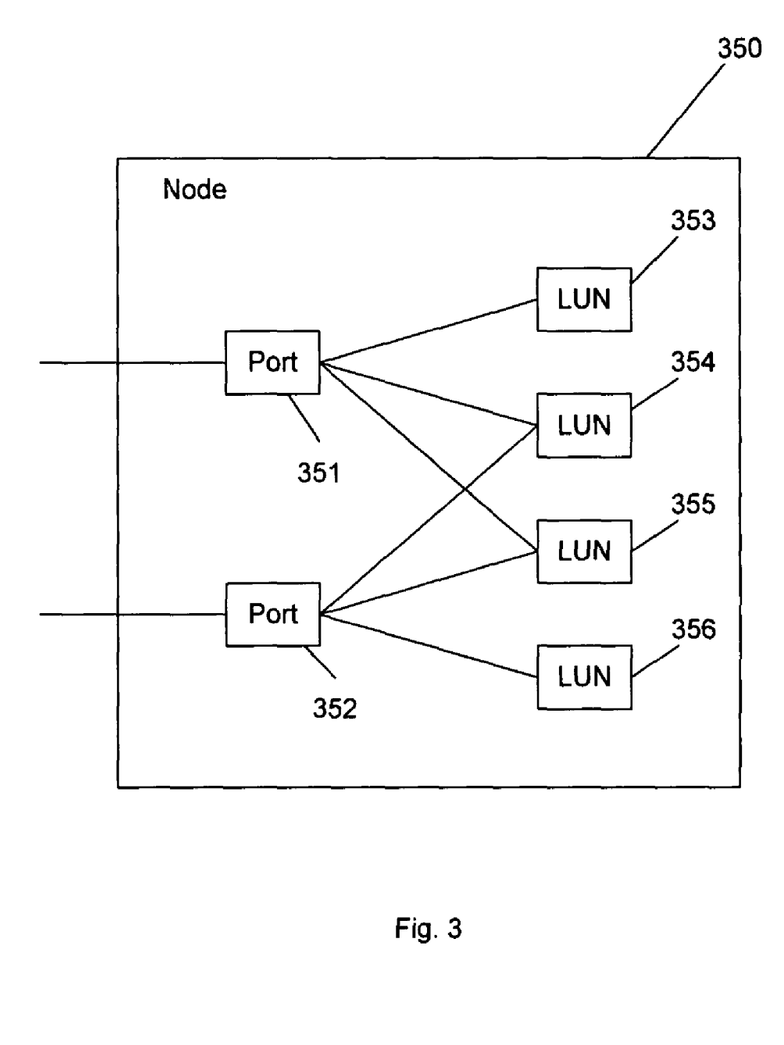
FIG. 3 illustrates a node having a number of ports, which may be connected to the data network shown in FIG. 2.

FIG. 3 illustrates a node 350 having a number of ports, including ports 351 and 352, which may be connected to the data network 221 shown in FIG. 2. In this context, the node 350 can represent any device having ports, which may be connected to the data network 221 of FIG. 2. The node also has a number of entities 353, 354, 355, 356, which are accessible through one or more of the ports, and which are identified by logical unit numbers (LUNs), each of which is unique for any single node. For example, if the node 350 is a storage subsystem, each logical storage volume is assigned a unique LUN.

Figure 4:
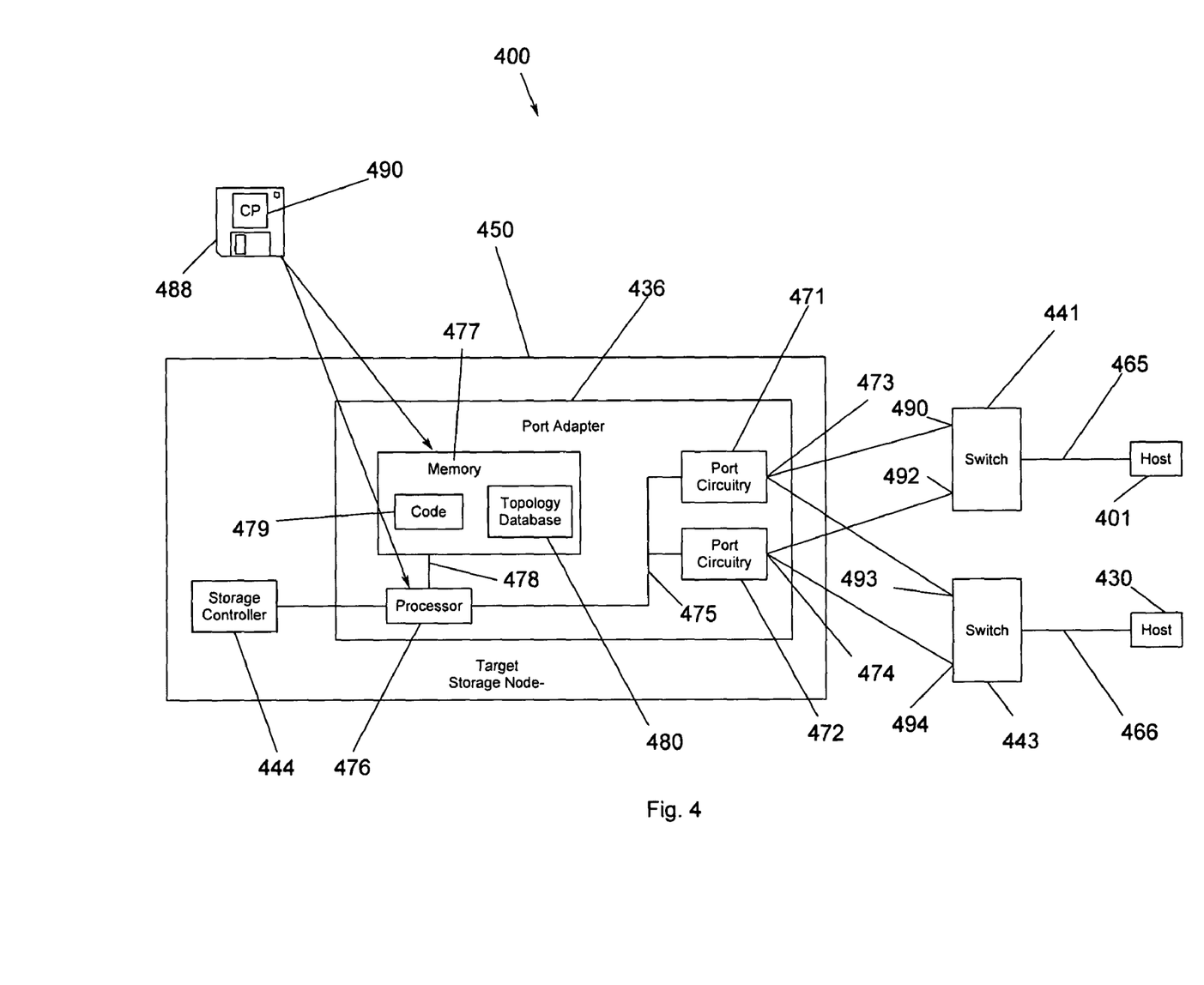
FIG. 4 illustrates a detailed block diagram of the Fibre Channel network of FIG. 1.

FIG. 4 illustrates a detailed block diagram 400 of the Fibre Channel network of FIG. 1. In FIG. 4, each of the nodes 401, 430 is shown to have host ports 465, 466 directly linked to a port adapter 436 via switches 441, 443. Thus, if a switch is replaced with a different switch, the WWN associated with a port will change. Consider a host node 430 connected to a target storage node 450 through a host port 466 that is connected to a Fibre Channel switch 443 that is also connected to a target storage port 474. The target storage node 450 may query a topology database 480 stored in the port adapter to verify that it has a path to the host port 446 through a redundant port 473 in case the WWNN and WWPN associated with port 474 are moved to the physical interface implemented by port 473.

As further shown in FIG. 4, the port adapter 436 includes port circuitry 471, 472 for each of its two ports 473 and 474. The port circuitry, for example, includes application-specific integrated circuits (ASICs) for communicating over the switches 441, 443 in accordance with the Fibre Channel standards. The port circuitry 471, 472 is connected to an input/output bus 475 of a microprocessor 476. The microprocessor 476 is connected to a random access memory 477 by a memory bus 478. The microprocessor 476 is also interfaced to the storage controller 444. The memory 477 stores code 479 executed by the microprocessor 476.

In a Fibre Channel network, a port adapter 436 has a 64-bit port identifier called a "World Wide Name" (WWN). To ensure that the WWN is unique, for example, it may include a unique identifier of the manufacturer of the device including the node (e.g., an Organizationally Unique Identifier as registered with the IEEE in New York, N.Y.), and the manufacturer's serial number of the device. A logical storage volume in a Fibre Channel storage subsystem therefore can be identified by the combination of the WWN of the storage subsystem and the LUN of the logical volume. WWNs and World Wide Port Names (WWPNs) are stored in a topology database 480. While the topology database 480 is shown in the memory 477 of the port adapter 436, a topology database 480 may be provided in any physical interface, e.g., switches 441, 443.

Figure 5:
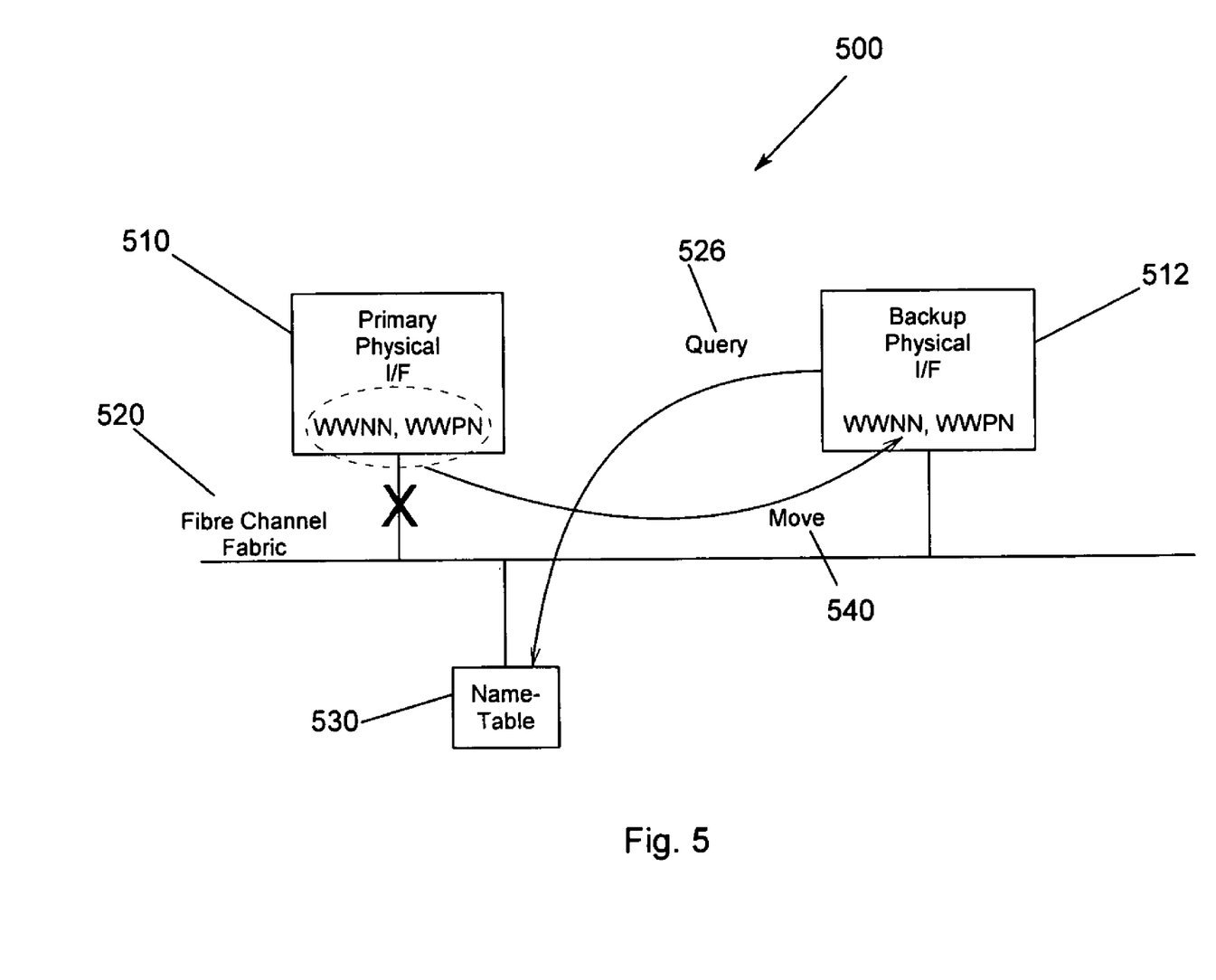
FIG. 5 illustrates a Fibre Channel network according to an embodiment of the present invention wherein a redundant Fibre Channel path is provided.

FIG. 5 illustrates a Fibre Channel network 500 according to an embodiment of the present invention wherein a redundant Fibre Channel path is provided. In FIG. 5, a first physical interface 510 and a backup physical interface 512 are coupled to the Fibre Channel fabric 520. Whenever a connection is added or removed from a Fiber Channel Fabric 520, a State Change Notification occurs. All devices on the Fabric are then notified that a device has either been added or removed. At that time, the backup physical interface 512 may query 526 the name-table 530 stored in the Fabric 520 to verify that it has a path to the other end of the connection in case the WWNN and WWPN are moved 540 to the backup physical interface 512.

In the Fiber Channel network 500, the portion of the network connected to each port has one of four distinct topologies; namely, point-to-point, private loop, public loop, and fabric. A point-to-point topology has one port connected directly to one other port. A loop is a single simplex media linking two or more nodes such that transmission can occur between a single pair of nodes on the media at any given time. A hub is a specific implementation of a loop in which a node can be inserted into or removed from the hub with minimal disruption in the loop. A private loop is a dedicated or closed loop whose ports are accessible only by other devices directly connected to that private loop. A public loop is a loop attached to a node of a fabric. A fabric 520 is a topology that permits multiple simultaneous transmissions between pairs of nodes connected to it. The fabric 520 routes or switches data frames from a source node to a destination node. A switch is an implementation of the fabric topology.

In a Fiber Channel network 500, physical interfaces 510, 512 that are directly connected to Fiber Channel Fabric 520 can determine all other nodes in the fabric 520 by polling the name table located in the fabric or as part of the loop or port initialization process. Information obtained through the port login process or through a query of the name table 530 can be used to determine if the physical interfaces 510, 512 can be reached through the fabric or loop. For example, associated with the fabric is a name table 530 that will provide a list of physical interfaces 510, 512 directly accessible through the fabric 520. The name table 530 has a predefined address on the fabric 520. A physical interface 510, 512 can also obtain the configuration of a point-to-point connection or loop connected to each node directly accessible through the point to point connection or loop connection respectively during the loop or port initialization process.

A request from one port to another on fabric 520 must identify the destination port so that only the destination port will respond to the request. A request from one port to another on fabric 520 must also identify the source of the request so that a response can be directed back to the source. To save bandwidth, a temporary identifier for each port to uniquely identify a source or desired destination of a request transmitted through the network.

The Fiber Channel standards specify that data is transmitted over the Fiber Channel network 500 in packets having a predefined format, and such a packet is called a "frame." Each frame includes a source address (S_ID) and a destination address (D_ID). The S_ID is an identifier of the port, which is the source of the frame, and the D_ID is an identifier of the port, which is the desired destination of the frame.

After an initial fabric login process, it is possible for the configuration of the fabric 520 to become changed as a result of addition or replacement of devices having ports connected to the fabric 520. Moreover, whenever a connection is added or removed from a Fiber Channel Fabric 520, a State Change Notification occurs. All devices on the Fabric are then notified that a device has either been added or removed, e.g., after a state change notification occurs, the backup physical interface 512 may query, 526 the name-table 530 stored in the Fabric 520 to verify that it has a path to the other end of the connection in case the WWNN and WWPN from the primary physical interface 510 are moved 540 to the backup physical interface 512.

The Fiber Channel specifications provide a mechanism for the network to automatically detect certain changes of state, which may indicate that the configuration of the system has changed. For example, idle signals are transmitted over the links to enable detection of link failure. Frame transmission errors are detected by cyclic redundancy checks and sequence identification numbers in the frames. When transmission over a link is restored after detection of a link failure, a fabric may require the ports connected by the link to login for reassignment of IDs to the ports. As described above, fabric 520 supports a "state change notification" process in which ports having operational links to the fabric may request to be notified by the fabric when a state change is detected.

Figure 6:
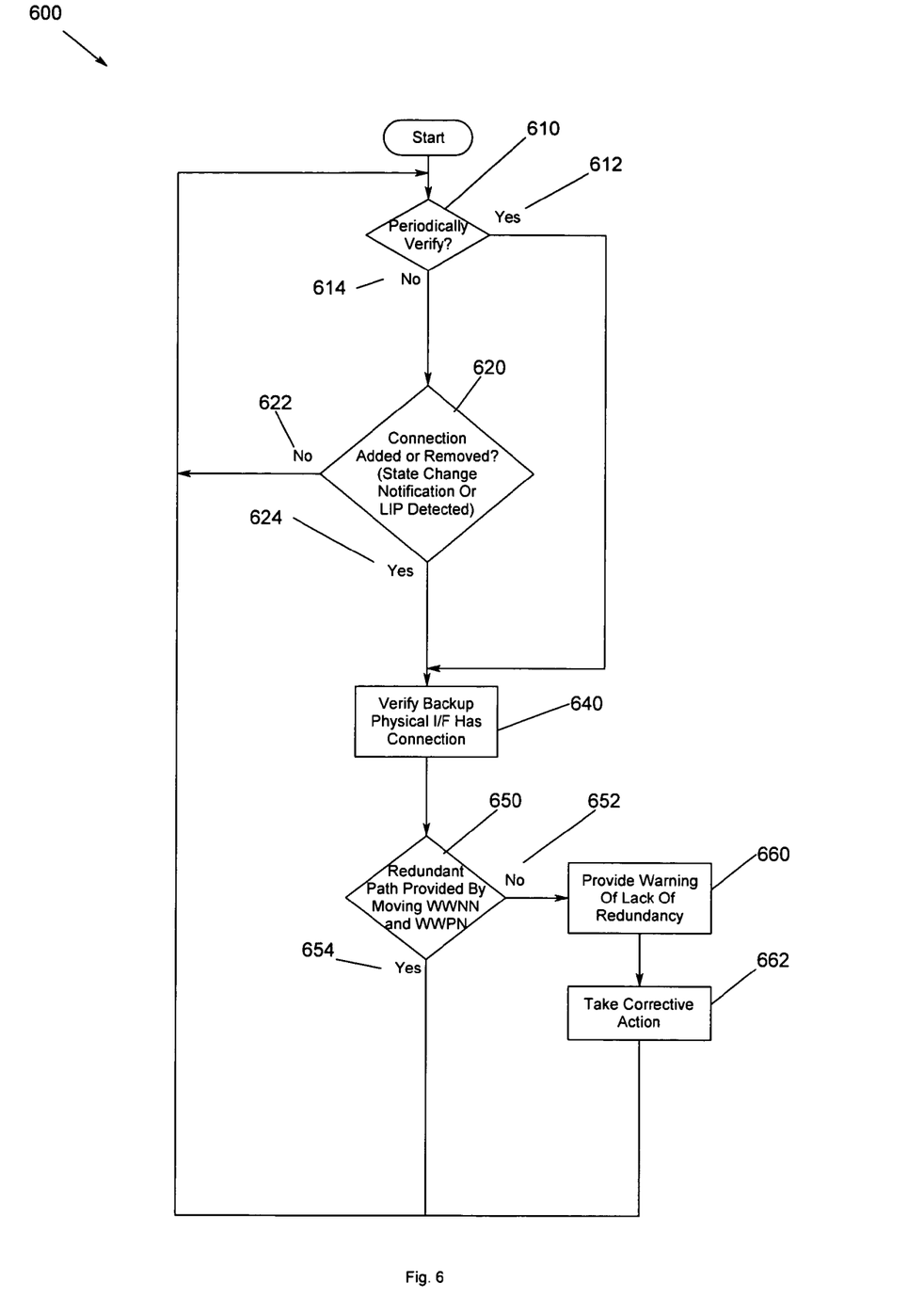
FIG. 6 illustrates a flow chart for verifying existence of a redundant Fibre Channel path according to an embodiment of the present invention.

FIG. 6 illustrates a flow chart 600 for verifying existence of a redundant Fibre Channel path according to an embodiment of the present invention. A first physical interface and a backup physical interface are coupled to the Fibre Channel fabric. In FIG. 6, a determination is made whether periodic verification of redundant paths is to be performed 610. If yes 612, the verification is performed 640. If not 614, a determination is made of whether a connection is added or removed from a Fibre Channel Fabric 620. If not 622, the system continues to wait until a connection is added or removed or until the verification period has elapsed. If a connection is added or removed 624, as indicated by a State Change Notification for example, all devices on the Fabric are then notified that a device has either been added or removed. If a connection is added or removed 624, a State Change Notification occurs 630. All devices on the Fabric are then notified that a device has either been added or removed. Verification of whether the backup physical interface has the connection is performed 640. A determination is made whether a redundant physical path exists to the other end of the connection in case the WWNN and WWPN are moved to this physical interface 650.

If no path exists 652, then the appropriate warning can be displayed notifying the system administrator that there is a lack of redundancy 660 and corrective action should be taken 662 before a problem occurs where this redundancy would be required for the system to continue to operate. If a redundant path exists 654, the backup connection is used.

The determination of whether a redundant connection exists 650 may be provided by the backup physical interface querying the name-table stored in the Fabric to verify that it has a path to the other end of the connection in case the WWNN and WWPN are moved to this physical interface. The periodically checking the name table to verify that redundant paths exist 610 may be omitted if desired. If the system periodically checks the name table 612, the alternate path does not need to query or contact in any way the system at the other end of the communication path because this could cause problems since this is not a normal event in a fabric environment. As well, in an arbitrated loop environment, after each Loop Initialization Primitive (LIP) the interface could check the loop ID's to make sure it has access to the other end of the communication path.

The process illustrated with reference to FIGS. 1-6 may be tangibly embodied in a computer-readable medium, e.g., one or more of the fixed and/or removable data storage devices 488 illustrated in FIG. 4, or other data storage or data communications devices. The computer program 490 may be loaded into memory 477 to configure the processor 478 for execution of the computer program 490. The computer program 490 includes instructions which, when read and executed by a processor 478 of FIG. 4, causes the processor 478 to perform the steps necessary to execute the steps or elements of an embodiment of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method, comprising:
   maintaining a topology database that stores paths through a network which are available to communicably connect a storage node to a host node; and
   verifying by the storage node using the topology database that the storage node has at least two paths to the host node.

2. The method of claim 1, further comprising:
   detecting a connection change in a path from the storage node to the host node.

3. The method of claim 2, further comprising:
   without interruption of operations, using a redundant path, found in the topology database, for communications between the storage node and the host node.

4. The method of claim 2, wherein the detecting a connection change further comprises issuing a state change notification indicating a device has been added to the network.

5. The method of claim 2, wherein the detecting a connection change further comprises issuing a state change notification indicating a device has been removed from the network.

6. The method of claim 2, wherein the detecting a connection change further comprises issuing a state change notification indicating a device has failed and severed a connection to the network.

7. The method of claim 1, wherein the topology database is maintained by the storage node.

8. The method of claim 7, further comprising:
   maintaining a second topology database, which stores paths in a network available to communicably connect the host node to the storage node, wherein the second topology database is maintained by the host node; and
   verifying by the host node using the second topology database whether the host node has at least two paths to the storage node.

9. The method of claim 2 further comprising moving a World Wide Name and World Wide Port Name associated with the connection change to the storage node to provide a redundant path to the host.

10. The method of claim 2, wherein the detecting a connection change further comprises receiving an indication from a Loop Initialization Primitive indicating a device has been added to an Arbitrated Loop.

11. The method of claim 2, wherein the detecting a connection change further comprises receiving an indication from a Loop Initialization Primitive indicating a device has been removed from an Arbitrated Loop.

12. The method of claim 2, wherein the detecting a connection change further comprises receiving an indication from a Loop Initialization Primitive indicating a device has failed and severed a connection to an Arbitrated Loop.

13. The method of claim 1, further comprising:
   when the verifying step indicates that the storage node has fewer than two paths to the host node, displaying a warning of lack of redundancy.

14. The method of claim 13, further comprising:
   taking corrective action in response to the warning of lack of redundancy.

15. The method of claim 13, wherein displaying the warning occurs while there are no problems of communication between the storage node and the host node using an existing path.

16. The method of claim 1 further comprising moving an Arbitrated Loop Physical Address associated with the connection change to the storage node to provide a redundant path to the host.

17. The method of claim 1, wherein the verifying is performed periodically.

18. A port adapter for providing a redundant Fibre Channel path, comprising:
   a port, within a storage node and coupled to a Fibre Channel network,
   a topology database that stores paths through the network that are available to communicably connect the storage node to a host node; and
   a processor, coupled to the port, the processor configured for detecting a connection change between the storage node and a host node, and verifying using the topology database that the port has at least two such paths to the host node.

19. The port adapter of claim 18, wherein the processor detects a connection change in response to a state change notification indicating a device has been added to the Fibre Channel network.

20. The port adapter of claim 18, wherein the processor detects a connection change in response to a state change notification indicating a device has been removed from the Fibre Channel network.

21. The port adapter of claim 18, wherein the processor detects a connection change in response to a state change notification indicating a device has failed and severed a connection to the Fibre Channel network.

22. The port adapter of claim 18, wherein the processor verifies the port has a path to a connection associated with the connection change by querying a name table to determine whether the port is coupled via a redundant path to the host.

23. The port adapter of claim 18, wherein a World Wide Name and World Wide Port Name associated with the connection change are changed to be associated with the port to provide a redundant path to the host.

24. The port adapter of claim 18, wherein the processor detects a connection change in response to a Loop Initialization Primitive indicating a device has been added to an Arbitrated Loop.

25. The port adapter of claim 18, wherein the processor detects a connection change in response to a Loop Initialization Primitive indicating a device has been removed from an Arbitrated Loop.

26. The port adapter of claim 18, wherein the processor detects a connection change in response to a Loop Initialization Primitive indicating a device has failed and severed a connection to an Arbitrated Loop.

27. The port adapter of claim 18, wherein the topology database is maintained by the storage node.

28. The port adapter of claim 18 further comprising an Arbitrated Loop Physical Address associated with the connection change, wherein the Arbitrated Loop Physical Address associated with the connection change is changed to be associated with the port to provide a redundant path to the connection associated with the connection change.

29. The port adapter of claim 18, wherein the processor verifies the port has a path to a connection associated with the connection change by periodically verifying the port has a path to a connection associated with the connection change.

30. The port adapter of claim 18, wherein the processor provides a warning of lack of redundancy when the port does not have a path to a connection associated with the connection change.

31. The port adapter of claim 30, wherein the processor takes corrective action in response to the warning of lack of redundancy.

32. A network providing a redundant Fibre Channel path, comprising:
   a local node within a storage device; and
   a Fibre Channel network coupling the local node and a remote host node,
   wherein at least one of the local node and the Fibre Channel network includes a first physical interface and a backup physical interface, wherein the backup physical interface further comprises:
   a port coupled to a Fibre Channel network, and
   a processor, coupled to the port, the processor configured for detecting a connection change in a Fibre Channel network and verifying the backup physical interface has a path to the host node after the connection change.

33. The network of claim 32, wherein the processor detects a connection change in response to a state change notification indicating a device has been added to the Fibre Channel network.

34. The network of claim 32, wherein the processor detects a connection change in response to a state change notification indicating the first physical interface has been removed from the Fibre Channel network.

35. The network of claim 32, wherein the processor detects a connection change in response to a state change notification indicating the first physical interface has failed and severed a connection to the Fibre Channel network.

36. The network of claim 32, wherein the processor verifies the backup physical interface has a path to the host by querying a name table.

37. The network of claim 32, wherein a World Wide Name and World Wide Port Name associated with the connection change are changed to be associated with the backup physical interface to provide a redundant path to the host.

38. The network of claim 32, wherein the processor verifies the backup physical interface has a path to the host periodically.

39. The network of claim 32, wherein the processor detects a connection change in response to a Loop Initialization Primitive indicating a device has been added to an Arbitrated Loop.

40. The network of claim 32, wherein the processor detects a connection change in response to a Loop Initialization Primitive indicating a device has been removed from an Arbitrated Loop.

41. The network of claim 32, wherein the processor detects a connection change in response to a Loop Initialization Primitive indicating a device has failed and severed a connection to an Arbitrated Loop.

42. The network of claim 32, wherein the processor verifies the port has a path to the host by querying a Topology Database.

43. The network of claim 32 further comprising an Arbitrated Loop Physical Address associated with the connection change, wherein the Arbitrated Loop Physical Address associated with the connection change is changed to be associated with the port to provide a redundant path to the host.

44. The network of claim 32, wherein the processor provides a warning of lack of redundancy when the backup physical interface does not have a path to the host.

45. The network of claim 44, wherein the processor takes corrective action in response to the warning of lack of redundancy.

46. A program storage device readable by a processor, the program storage device tangibly embodying one or more programs of instructions executable by the processor to perform a method for providing a redundant Fibre Channel path, the method comprising:
   maintaining a topology database that stores paths in a Fibre Channel network which are available to communicably connect a storage node to a host node; and
   verifying by the storage node using the topology database that the storage node has at least two paths to the host node,
wherein the processor is included in the storage device or in the Fibre Channel network.

47. The program storage device of claim 46, wherein the verifying further comprises querying a name table stored in the Fibre Channel network.

48. The program storage device of claim 46 further comprising moving a World Wide Name and World Wide Port Name associated with a connection change to the backup device to provide a redundant path to the host.

49. A device for providing a redundant Fibre Channel path, comprising:
   Means, within a storage node or a Fibre Channel network, for providing a port to the Fibre Channel network, and
   means, within the storage node or the Fibre Channel network, for processing coupled to the means for providing a port, the means for processing detecting a connection change in a Fibre Channel network and verifying the means for providing a port has a path to a host after the connection change.

50. A network providing a redundant Fibre Channel path, comprising:
   a local node within a storage device; and
   a Fibre Channel network coupling the local node and a remote host node,
   wherein at least one of the local node and the Fibre Channel network includes a first means for providing a physical interface and a second means for providing a backup physical interface, wherein the second means further comprises:
   means for providing a port to a Fibre Channel network, and
   means for processing coupled to the means for providing a port, the means for processing detecting a connection change in a Fibre Channel network and verifying the backup physical interface has a path to the host node after the connection change.

* * * * *

UNITED STATES PATENT AND TRADEMARK OFFICE
CERTIFICATE OF CORRECTION

| | | |
|---|---|---|
| PATENT NO. | : 7,672,226 B2 | Page 1 of 1 |
| APPLICATION NO. | : 10/658679 | |
| DATED | : March 2, 2010 | |
| INVENTOR(S) | : Shea | |

It is certified that error appears in the above-identified patent and that said Letters Patent is hereby corrected as shown below:

Title page, Column 2 (Abstract) item [57]
Delete "Fiber" and insert --Fibre--, therefor.

Title page, Column 2 (Abstract) item [57]
Delete "Fiber" and insert --Fibre--, therefor.

Page 2, Column 1, Line 2 (Other Publications)
Delete "disk_thrashig.htm." and insert --disk_thrashing.htm.--, therefor.

Column 5, Line 66
Delete "example" and insert --example,--, therefor.

Column 6, Line 36
After "to" delete "a".

Column 6, Line 44
Delete "446" and insert --466--, therefor.

Column 8, Line 47
Before "path" delete "physical".

Column 8, Line 52
Delete "he" and insert --be--, therefor.

Signed and Sealed this
Twenty-fifth Day of January, 2011

David J. Kappos
*Director of the United States Patent and Trademark Office*